United States Patent
Arsu et al.

(10) Patent No.: US 10,526,240 B2
(45) Date of Patent: Jan. 7, 2020

(54) PREPARATION METHOD OF NANOCOMPOSITE FILMS COMPRISING GOLD NANOPOARTICLE VIA PHOTOPOLYMERIZATION TECHNIQUE

(71) Applicants: Nergis Arsu, Istanbul (TR); Tolga Ceper, Istanbul (TR)

(72) Inventors: Nergis Arsu, Istanbul (TR); Tolga Ceper, Istanbul (TR)

(*) Notice: Subject to any disclaimer, the term of this patent is extended or adjusted under 35 U.S.C. 154(b) by 0 days.

(21) Appl. No.: 16/067,118

(22) PCT Filed: Dec. 28, 2016

(86) PCT No.: PCT/TR2016/050557
§ 371 (c)(1),
(2) Date: Jun. 28, 2018

(87) PCT Pub. No.: WO2017/116372
PCT Pub. Date: Jul. 6, 2017

(65) Prior Publication Data
US 2019/0023607 A1    Jan. 24, 2019

(30) Foreign Application Priority Data

Dec. 31, 2015  (TR) .............................. a 2015 17742

(51) Int. Cl.
| | | |
|---|---|---|
| *C08F 2/46* | (2006.01) | |
| *C08F 2/50* | (2006.01) | |
| *C08G 61/04* | (2006.01) | |
| *C03C 17/00* | (2006.01) | |
| *C08F 222/10* | (2006.01) | |
| *C08F 2/48* | (2006.01) | |
| *C08F 220/18* | (2006.01) | |
| *C08K 3/08* | (2006.01) | |
| *C08K 3/16* | (2006.01) | |
| *C08K 5/45* | (2006.01) | |
| *B82Y 30/00* | (2011.01) | |
| *C03C 17/06* | (2006.01) | |
| *C03C 17/32* | (2006.01) | |

(52) U.S. Cl.
CPC .......... *C03C 17/007* (2013.01); *C03C 17/009* (2013.01); *C08F 2/48* (2013.01); *C08F 220/18* (2013.01); *C08F 222/1006* (2013.01); *C08K 3/08* (2013.01); *C08K 3/16* (2013.01); *C08K 5/45* (2013.01); *B82Y 30/00* (2013.01); *C03C 17/06* (2013.01); *C03C 17/32* (2013.01); *C03C 2217/445* (2013.01); *C03C 2217/479* (2013.01); *C03C 2218/32* (2013.01); *C08K 2003/0831* (2013.01); *C08K 2201/005* (2013.01)

(58) Field of Classification Search
CPC ......... C08J 3/28; C08J 2367/04; A61K 47/34; B01J 21/063; B01J 2219/0892; B01J 35/004; B01J 35/19123; B01J 2219/0877; B01J 2219/1203; C08G 83/004
USPC ........... 522/53, 49, 6, 189, 184, 71, 1; 520/1
See application file for complete search history.

(56) References Cited

U.S. PATENT DOCUMENTS

| | | | |
|---|---|---|---|
| 2007/0243336 A1* | 10/2007 | Knuth | .................. B44C 1/1716 427/487 |
| 2009/0059368 A1* | 3/2009 | Kamada | .................. B32B 17/10 359/489.01 |

FOREIGN PATENT DOCUMENTS

EP            0363790 A2       4/1990

OTHER PUBLICATIONS

Karasu et al, 2-Mercapto Thioxanthone as a Chain Transfer Agent in the Free-Radical polymerization: A versatile Route to Incorporate Thioxanthone Moieties into Polymer Chain-ends, 2007, Journal of Applied Polymer Science, vol. 103, 3766-3770 (Year : 2007).*
Cokbaglan et al. "2-Mercaptothioxanthone as a Novel Photoinitiator for Free Radical Polymerization," Macromolecules 2003, 36, 2649-2653.
Yagci et al. "In situ Synthesis of Gold-Cross-linked Poly(ethylene glycol) Nano Composites by Photoinduced Electron Transfer and Free Radical Polymerization Processes," Chem. Commun., 2008, 2771-2773.
Balan et al. "Controlling the morphology of gold nanoparticles synthesized photochemically in a polymer matrix through photonic parameters," Nanotechnology 23 (2012) 415705.
Buruiana et al. "A benzophenone-bearing acid oligodimethacrylate and its application to the preparation of silver/gold nanoparticles/polymer nanocomposites," J. Nanopart. Res. (2013) 15:1335.

* cited by examiner

*Primary Examiner* — Jessica Whiteley
(74) *Attorney, Agent, or Firm* — SZDC Law P.C.

(57) ABSTRACT

It is related to a metal/polymer nanocomposite film comprising gold nanoparticle which has gold mirror feature, comprises acrylic based oligomer, acrylic based monomer, 2-mercapto thioxanthone which is an one-component type II. radicalic photoinitiator and chloroauric acid.

8 Claims, 7 Drawing Sheets

US 10,526,240 B2

Figure 1:
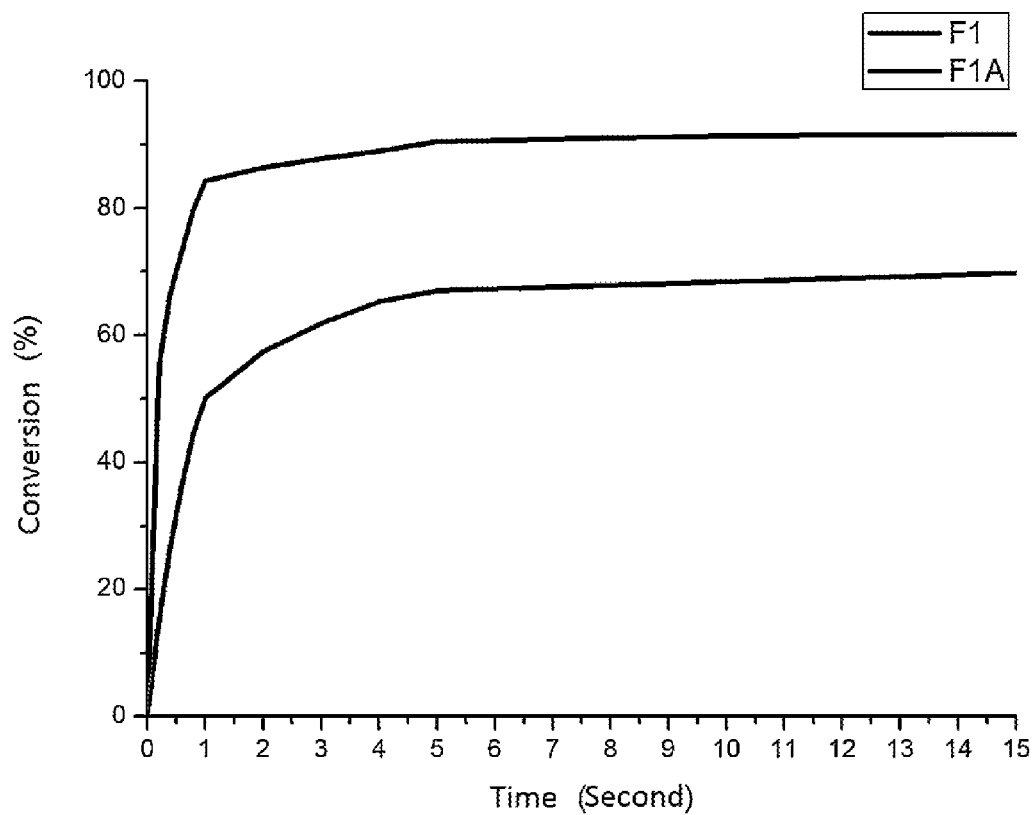

PREPARATION METHOD OF NANOCOMPOSITE FILMS COMPRISING GOLD NANOPOARTICLE VIA PHOTOPOLYMERIZATION TECHNIQUE

TECHNICAL FIELD

The invention is related to metal nanoparticles/polymer nanocomposite film comprising acrylic based oligomer, acrylic based monomer, 2-mercapto-thioxanthone (1) which is a one component type II radicalic photoinitiator and chloroauric acid, comprising gold nanoparticle which has gold mirror feature.

PRIOR ART

Conventionally, metal nanoparticles are synthesized by the reduction of different salts of the noble metals via different methods. The reduction process with sodium citrate or sodium borohydride is used in order that the nanoparticles with spherical form are synthesized conventionally. Besides, photoreduction of the metal salts via UV light is another nanoparticle obtaining method.

Because of high free surface energy, easily agglomeration of metal nanoparticles and dispersing of thermodynamically unstable particles in the formulation is a significant problem. Various methods are used in order to overcome this problem and to obtain stable particles. To illustrate these; citrate reduction, thiol stabilization and different thermal and photochemical techniques in which thiols, amines, micelles, dendrimer and polymers can be shown.

The control of the size and shape of Au nanoparticles has a significant importance in the science world. Because specific size and shape are important in the optical, electronical and catalytical processes. Being of Au nanoparticles in the composites is important in terms of bio/nanomedicine, sensor, catalyst and nanotechnology especially due to the fact that their optical properties depend on the particle shape. The particle shapes and sizes of gold nanoparticles can be determined by analyzing UV-VIS spectrums and an absorption is observed at the wavelength of 540 nm with the effect of surface plasmon band or at less or more wavelength according to the particle size. In the studies performed in a similar manner, positive contribution of the α-aminoalkyl radicals to be formed by adding tertiary amine as an addition to the formulations is observed.

When the studies in the literature are analyzed (2-4), it is seen that the less amount of formation of nanoparticles and SEM images displayed not good distribution of nanoparticles and the aimed mirror image does not form in the polymer matrix.

In the studies in the state of the art; various types of photoinitiators and coinitiators together with these initiators are used. In a performed study; thiol derivatives of thioxanthone molecule which have long alkyl chains are used as photoinitiator in the presence of tertiary amines (3). And as a result, the effect of thiol cannot be observed clearly.

Consequently; it is necessary to make a development in the technical field relating the production of the nanocomposite films comprising Au nanoparticle because of the insufficiencies mentioned above.

THE AIM OF THE INVENTION

The present invention is related to the method of preparation of nanocomposite films comprising gold nanoparticle via a photopolymerization technique which meets the needs mentioned above, removes all disadvantages and provides some additional advantages.

The aim of the invention is to obtain, in-situ formation of nanoparticles from their ions in a very short period of time with controlled size and distribution with minimum agglomeration. In the metal/polymer nanocomposite material, formation of nanoparticle and distribution of these particles in the polymer matrix are provided without agglomeration in a narrow range of size as it is seen in the SEM images and for the first time the nanoparticles accumulating on the surface of polymer matrix cause the reflective mirror image to form as a result of surface plasmon effect.

Another aim of the invention is that almost all of the nanoparticles which it comprises are in spherical shape.

A similar aim of the invention is that the sizes of the nanoparticles which it comprises are in a narrow range such as between 30 and 50 nm.

Another aim of the invention is that nanoparticles which it comprises are embedded into the surface of the film by being piled.

Another aim of the invention is that the obtained film comprises the golden color.

A similar aim of the invention is that poly(ethylene glycol) diacrylate, poly(ethylene glycol) monoacrylate, poly (ethylene glycol) methyl ether acrylate, trimethylpropane triacrylate, dipropylene glycol diacrylate, tripropylene glycol diacrylate, neopentyl glycol diacrylate, 1,6-hexanediol diacrylate, 2-methyl-1,3-propanediol diacrylate, neopentyl glycol propoxylate(2) diacrylate, trimethylpropane trimethacrylate, polyurethane acrylate or epoxy acrylate is used as cross linked polymer.

Another aim of the invention is that 2-mercapto thioxanthone which is a one-component type II radicalic photoinitiator is used as photoinitiator for performing the reduction of ions to metallic nanoparticles and polymerization processes. Therefore; the contribution of the thiol group in the molecule to nanoparticle stabilization without any addition of a second substance is detected. Also, the formed ketyl and thiyl radicals help reduction of the ions to the nanoparticle form while thiyl radicals contribute to formation of the polymer matrix.

Another aim of the invention is that the compound of chloroauric acid ($HAuCl_4$) is used as gold salt.

A similar aim of the invention is that while the photopolymerization method provides the fold ions to be reduced to the nanoparticles as in-situ, it provides the formation of the cross linked polymer matrix in which these nanoparticles distribute homogenously.

For achieving the aims mentioned above, metal/polymer nanocomposite film comprising gold nanoparticle which has the gold mirror feature is characterized in that;

it comprises acrylic based oligomer, acrylic based monomer, 2-mercapto thioxanthone which is an one-component type II radicalic photoinitiator and chloroauric acid.

The structural and characteristic properties and all advantages of the invention will be understood more clearly from the figures given below and the detailed description written by referring to these figures and for this reason, the evaluation needs to be done by considering these figures and detailed description.

THE FIGURES WHICH HELP FOR UNDERSTANDING OF THE INVENTION

FIG. 1: It is the IR conversion graph of the formulation in the presence and absence of AuNps (F1).

Figure 2:
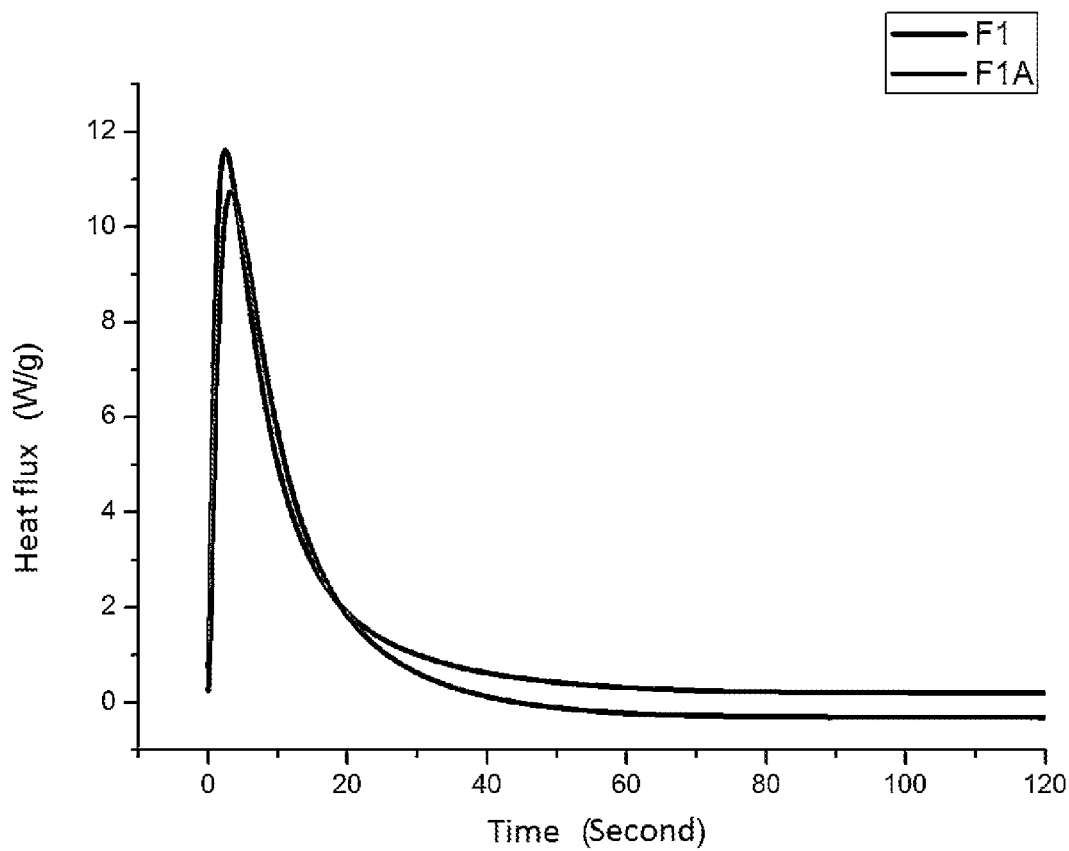

FIG. 2: It is the heat flux of polymerization graph in the presence and absence of AuNps.

Figure 3:
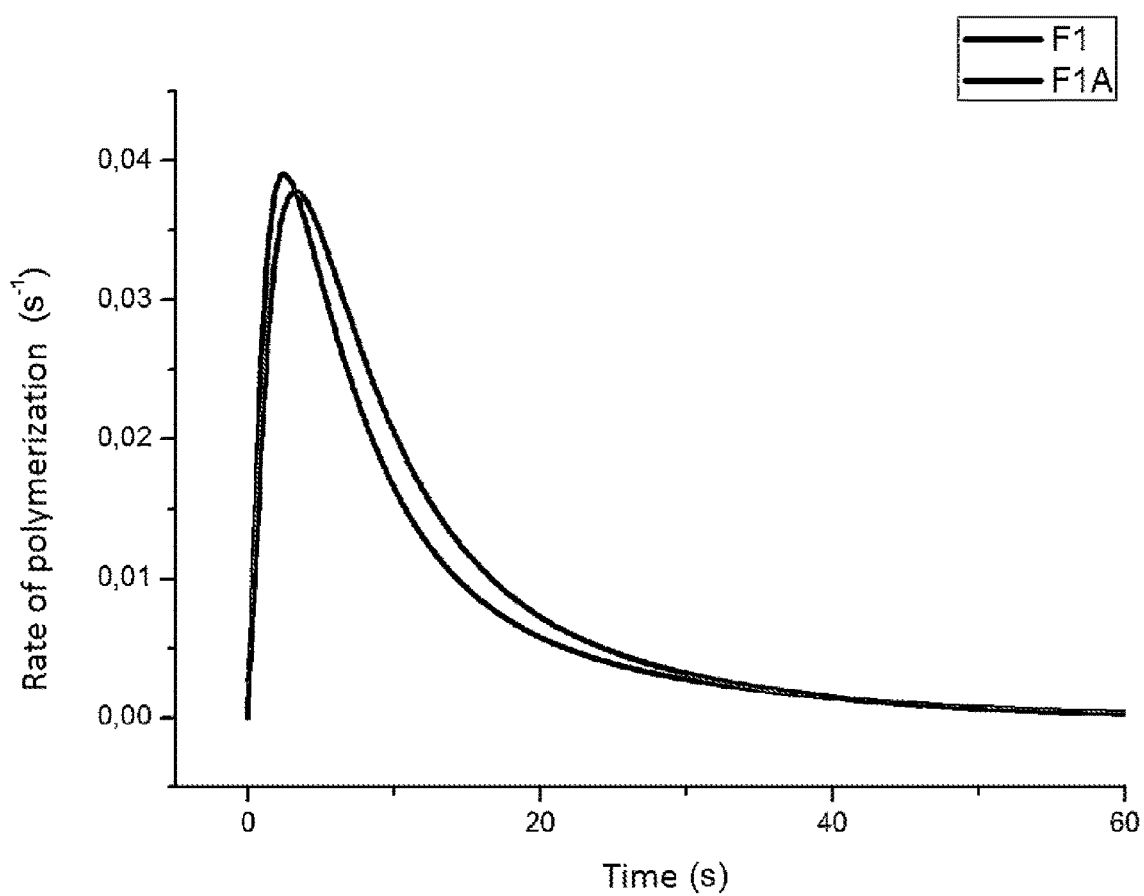

FIG. 3: It is the polymerization rate graph in the presence and absence of AuNps.

Figure 4:
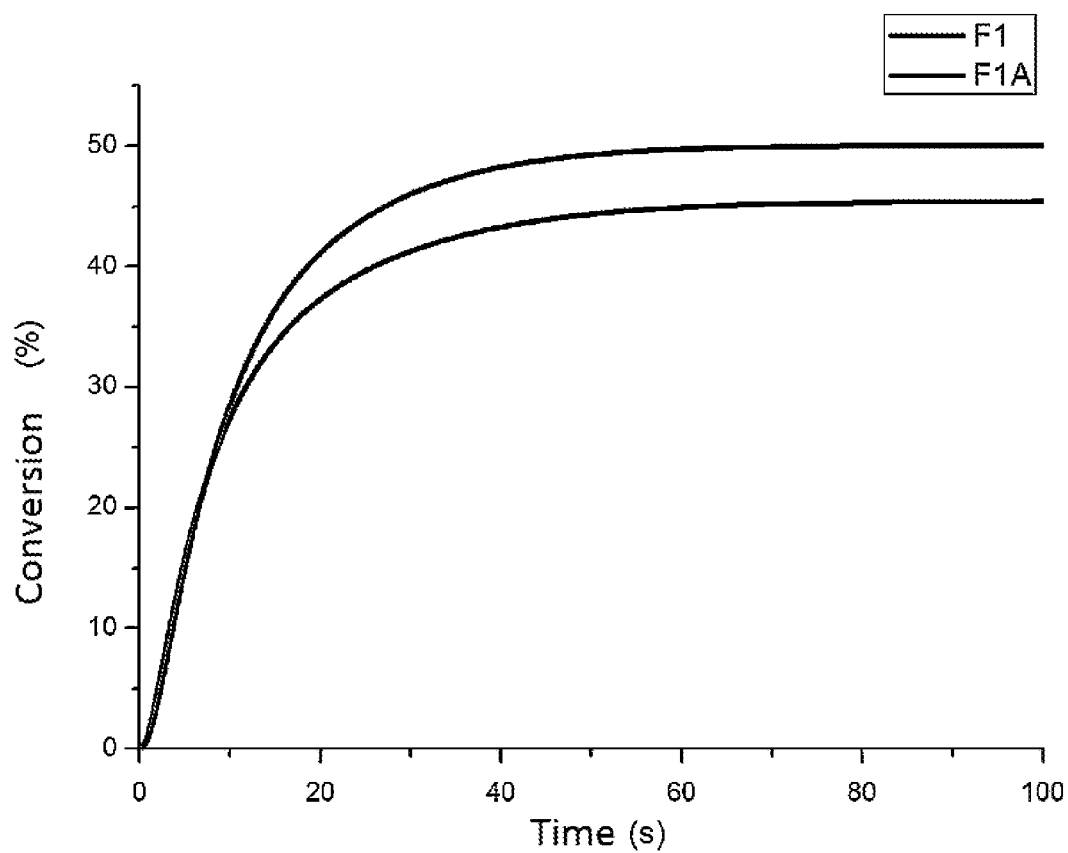

FIG. 4: It is the polymerization % conversion graph in the presence and absence of AuNps.

Figure 5:
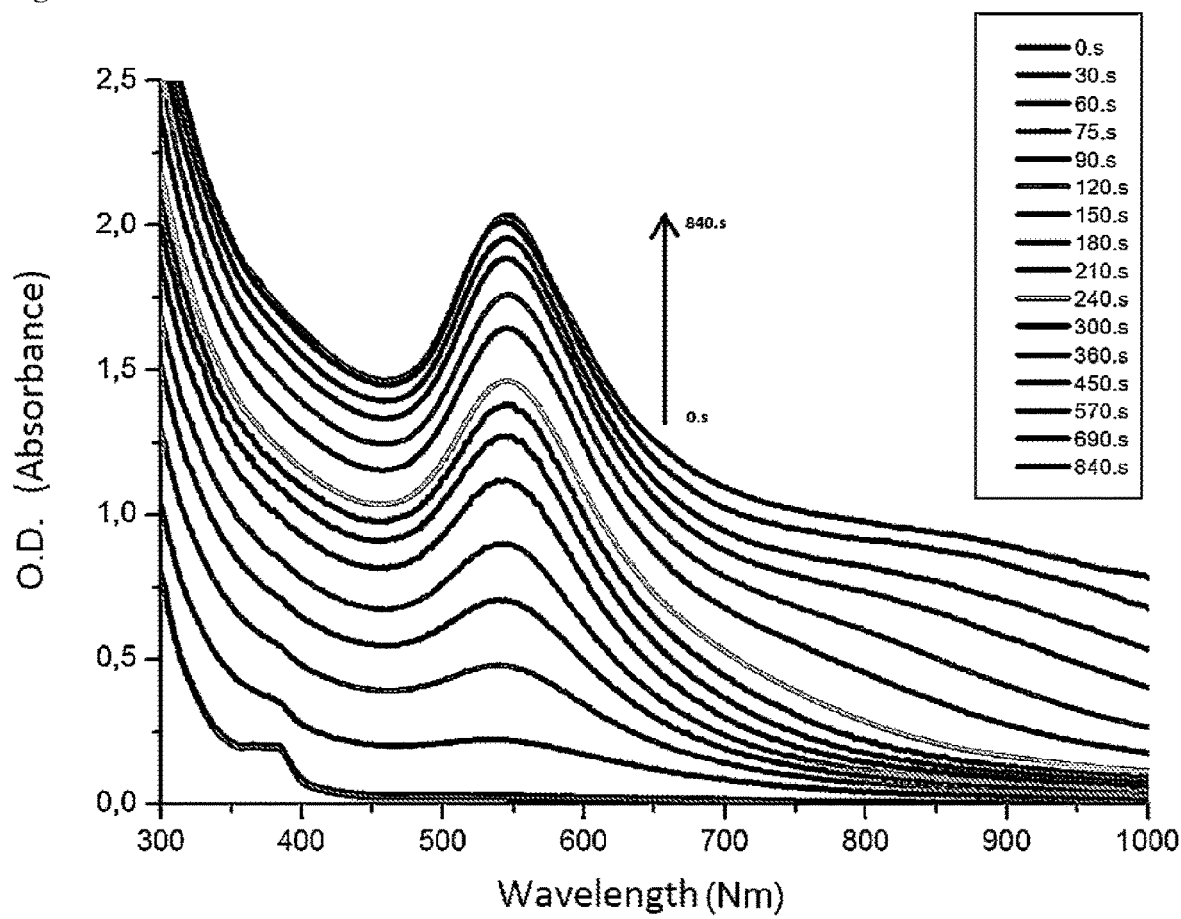

FIG. 5: It is the view of UV-VIS spectrum obtained by being exposed of the F1A formulation in the presence of AuNps to UV light in different time periods.

Figure 6:
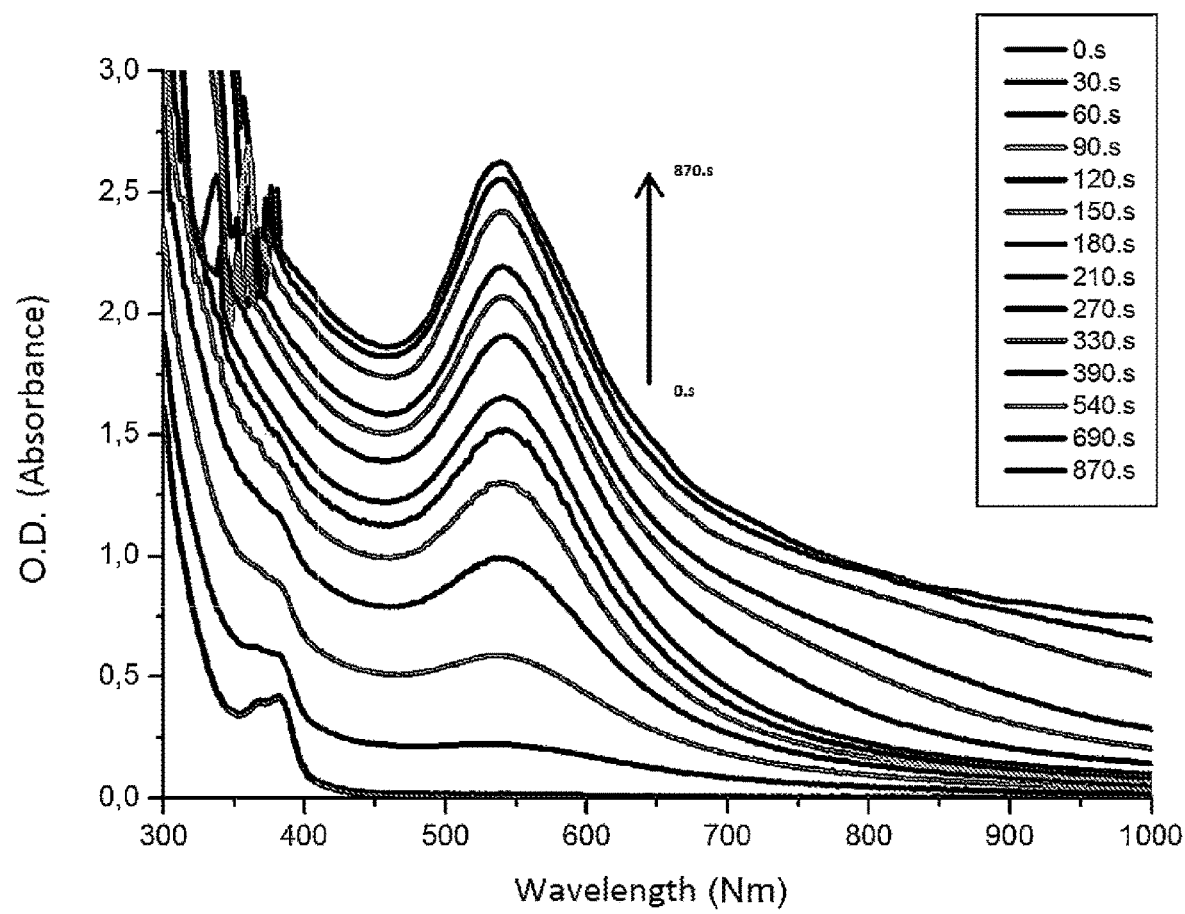

FIG. 6: It is the view of UV-VIS spectrum obtained by being exposed of the F2A formulation in the presence of AuNps to UV light in different time periods.

Figure 7A:
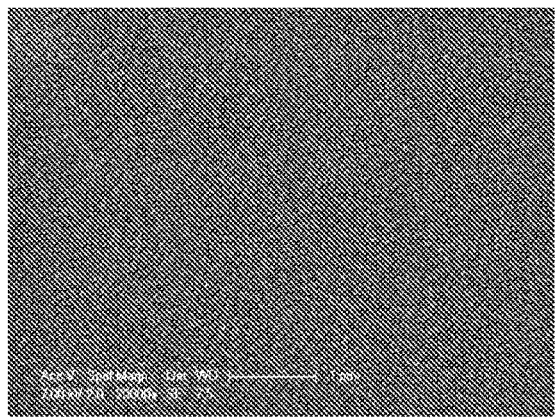

FIG. 7a: It is the 1 μm view of the F1A formulation in the presence of AuNps obtained as a result of SEM (Scanning Electron Microscope) analysis.

Figure 7B:
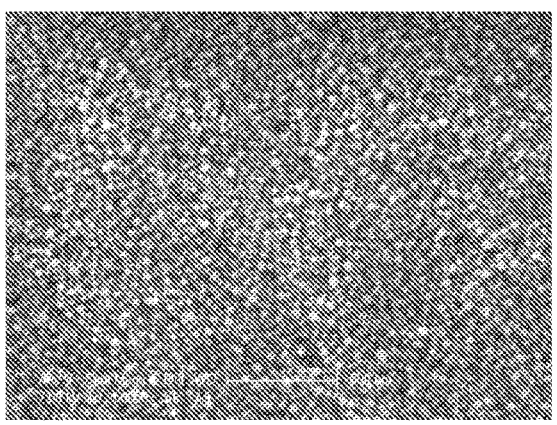

FIG. 7b: It is the 500 nm view of the F1A formulation in the presence of AuNps obtained as a result of SEM (Scanning Electron Microscope) analysis.

Figure 7C:
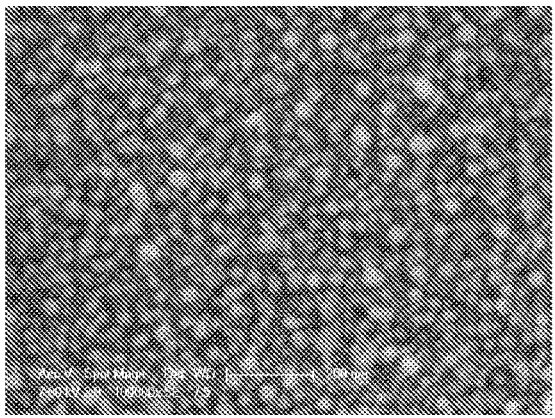

FIG. 7c: It is the 200 nm view of the F1A formulation in the presence of AuNps obtained as a result of SEM (Scanning Electron Microscope) analysis.

Figure 7D:
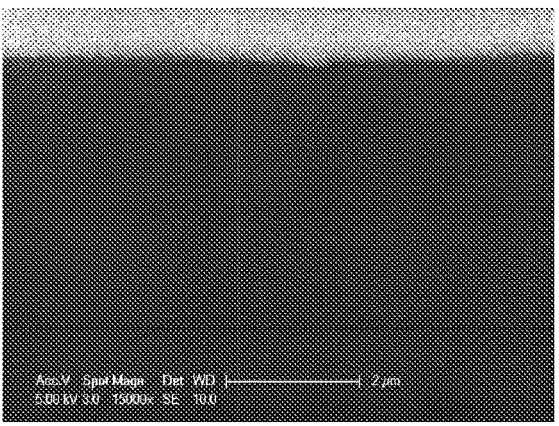

FIG. 7d: It is the sectional view of the F1A formulation in the presence of AuNps obtained as a result of SEM (Scanning Electron Microscope) analysis.

The drawings do not absolutely need to be scaled and the unnecessary details for understanding the present invention may be neglected. Other than that; the elements which are at least significantly identical or at least have significantly identical functions are shown with the same number.

Abbreviations

F1: Not comprising gold
F1A-F2A: Comprising gold

DETAILED DESCRIPTION OF THE INVENTION

In this detailed description, the preferred arrangements of the disclosed preparation method of the nanocomposite films comprising gold nanoparticle via photopolymerization technique are described only for better understanding of the matter and such that it does not create any limiting effect.

The invention is the method of preparation of metal/polymer nanocomposite film comprising gold nanoparticle which has gold mirror feature. In the said method; multifunctional acrylate and diluting monomer; 2-mercapto thioxanthone which is a one-component type II radicalic photoinitiator; the compound of chloroauric acid ($HAuCl_4$) as the gold salt are used for performing reduction and polymerization processes. In addition to these, formation of cross linked polymer matrix and reduction of the ions to gold nanoparticles as in-situ are realized via photopolymerization method for production of nanocomposites at the room temperature fast and effectively.

The disclosed production method of the invention comprises the formulation below. The number of said formulation is 2 with 2-mercapto thioxanthone used in different percentages.

| Formulation | $HAuCl_4$ | 2-mercapto thioxanthone | Acrylic Oligomer | Acrylic Monomer |
|---|---|---|---|---|
| F1A | %4 wt (0.04 g) | %0.5 wt (0.005 g) | %76.4 wt (0.764 g) | %19.1 wt (0.191 g) |

| Formulation | $HAuCl_4$ | 2-mercapto thioxanthone | Acrylic Oligomer | Acrylic Monomer |
|---|---|---|---|---|
| F2A | %4 wt (0.04 g) | %1 wt (0.01 g) | %76 wt (0.76 g) | %19 wt (0.19 g) |

For preparation of cross linked polymer in the said formulation; poly(ethylene glycol) diacrylate, poly(ethylene glycol) monoacrylate, poly(ethylene glycol) methyl ether acrylate, trimethylpropane triacrylate, dipropylene glycol diacrylate, tripropylene glycol diacrylate, neopentyl glycol diacrylate, 1,6-hexanediol diacrylate, 2-methyl-1,3-propanediol diacrylate, neopentyl glycol propoxylate(2) diacrylate, trimethylpropane trimethacrylate, polyurethane acrylate or epoxy acrylate are used as acrylic based oligomer and acrylic based monomer.

The Method of Preparation of Nanocomposite Film Comprising Gold Nanoparticle by Using the Percentages in the Desired Formulation:

1) Preparation of solution by using the formulation comprises the process steps of:
    putting 2-mercapto thioxanthone and $HAuCl_4$ into a beaker at the room temperature,
    addition of the acrylic based oligomer and monomer,
    leaving the obtained acrylic based mixture into the ultrasonic bath at the room temperature for approximately 15 minutes,
    then, making it homogeneous by mixing for approximately 2 seconds via a probe type ultrasonic mixer,
    lastly, degassing with the ultrasonic bath.
2) Obtaining nanocomposite film via the solution is:
    coating the obtained solution on glass plate such that its thickness is 40 micrometer,
    being exposed to UV light via UV-curing device.

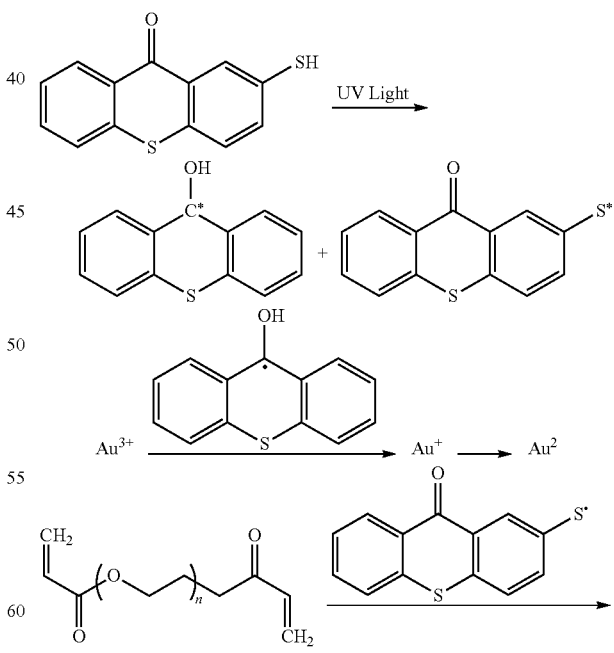

Experimental Studies:

After the disclosed formulation of the invention was synthesized, the efficiency for obtaining the invention was calculated by using of FTIR (Fourier Transform Infrared) spectra. FTIR spectra as a result of being exposed of the formulations to light for specific time periods were taken and the decrease seen at the peak at 1640 cm$^{-1}$ was recorded. Percentage conversion was calculated (FIG. 1). The conversion percentages of the formulations comprising Au salt were obtained lower as expected.

Heat flux of polymerization (FIG. 2), rate of polymerization (FIG. 3), conversion percentage (FIG. 4) graphs were analyzed by using of Photo-DSC method (Differential Scanning calorimetry). Here, in the inert atmosphere it was seen that the conversion percentage of the formulation comprising Au nanoparticle is more.

For the characterization of the gold nanoparticles in the nanocomposite material, UV-VIS spectroscopy were used (FIGS. 5, 6 and 7). When the spectra were analyzed, formation of nanoparticles confirmed by absorption between at 510-570 nm.

The formation of Au nanoparticles has been proven also as in the literature. The absorption range gives us the idea about the nanoparticle size range.

When the SEM image is analyzed, the nanoparticles obtained in the formulation with number 1 are seen. The nanoparticles are mostly in spherical shape and have a diameter of 30-40 nm. For the formulation with number 1; 1 μm is in the FIG. 7a, 500 nm is in the FIG. 7b, 200 nm is in the FIG. 7c, sectional view is in the FIG. 7d.

Also the SEM graphs confirmed the UV-VIS results. It shows that the nanoparticle size stability and the distribution of nanoparticles are regular and there is very little agglomeration.

REFERENCES

1—Çokbağlan, L., Arsu, N., Yağci, Y., Jockush, S., Turro, J. N., (2003). "2-Mercaptothioxanthone as a Novel Photoinitiator for Free Radical Polymerization", Macromolecules, Vol. 36, No. 8, 2003.
2—Yağci, Y., Sangermano, M., Rizza, G., (2008). "In situ synthesis of gold cross-linked poly(ethylene glycol) nanocomposites by photoinduced electron transfer and free radical polymerization processes", Chem. Commun., 2008, 2771-2773.
3—Balan, L., Melinte, V., Buruiana, T., Schneider, R., and Vidal, L., Controlling the morphology of gold nanoparticles synthesized photochemically in a polymer matrix through photonic parameters, Nanotechnology 23 (2012) 415705.
4—Buruiana, E. C., Chibac, A. L., Buruiana, T., Melinte, V., Balan, L., A benzophenone-bearing acid oligodimethacrylate and its application to the preparation of silver/gold nanoparticles/polymer nanocomposites J Nanopart Res (2013) 15:1335.

The invention claimed is:

1. A metal/polymer nanocomposite film comprising gold nanoparticle which has the gold mirror feature wherein; raw materials are an acrylic based oligomer, an acrylic based monomer, a monocomponent type radical photoinitiator, 2-mercapto thioxanthone and chloroauric acid.

2. A nanocomposite film according to claim 1, wherein the acrylic based monomer is selected from the group consisting of poly(ethylene glycol) diacrylate, poly(ethylene glycol) monoacrylate, poly(ethylene glycol) methyl ether acrylate, trimethylpropane triacrylate, dipropylene glycol diacrylate, tripropylene glycol diacrylate, neopentyl glycol diacrylate, 1,6-hexanediol diacrylate, 2-methyl-1,3-propanediol diacrylate, neopentyl glycol propoxylate(2) diacrylate, trimethylpropane trimethacrylate, polyurethane acrylate and epoxy acrylate.

3. A nanocomposite film according to claim 1 characterized by comprising 76.4 wt % acrylic based oligomer, 19.1 wt % acrylic based monomer, 0.5 wt % 2-mercapto thioxanthone, and 4 wt % chloroauric acid.

4. A nanocomposite film according to claim 1 characterized by comprising 76 wt % acrylic based oligomer, 19 wt % acrylic based monomer, 1 wt % 2-mercapto thioxanthone, and 4 wt % chloroauric acid.

5. A method of producing film containing nanoparticles comprising gold metal/polymer nanocomposite which has gold mirror feature characterized by comprising the process steps of:
  placing 2-mercapto thioxanthone, chloroauric acid, an acrylic based oligomer and an acrylic-based monomer into a beaker at room temperature,
  b) leaving the beaker in step a) in an ultrasonic bath for approximately 15 minutes and mixing with a stirrer,
  c) obtaining a solution by applying a degas process in the ultrasonic bath to the beaker where the components in step a) become homogenous,
  d) coating the solution obtained in step c) onto a glass plate, and
  e) applying a curing process of the solution coated on the glass plate by exposure to UV rays in a UV-curing device.

6. The method according to claim 5, wherein the mixing process mentioned in the process step b) is performed via a probe type ultrasonic mixer.

7. The method according to claim 5, wherein the mixing process mentioned in the process step b) is performed for approximately 2 seconds.

8. A production method according to claim 5, wherein the acrylic based oligomer is selected from the group consisting of poly(ethylene glycol) diacrylate, poly(ethylene glycol) monoacrylate, poly(ethylene glycol) methyl ether acrylate, trimethylpropane triacrylate, dipropylene glycol diacrylate, tripropylene glycol diacrylate, neopentyl glycol diacrylate, 1,6-hexanediol diacrylate, 2-methyl-1,3-propanediol diacrylate, neopentyl glycol propoxylate(2) diacrylate, trimethylpropane trimethacrylate, polyurethane acrylate and epoxy acrylate.

* * * * *